May 21, 1929. A. W. MACHLET 1,713,543
FURNACE FOR MELTING METALS
Filed April 15, 1926
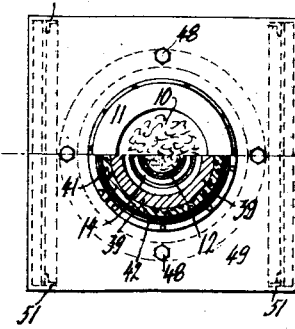
Inventor:
Adolph W Machlet
by B C Stickney
Attorney Patented May 21, 1929.

1,713,543

UNITED STATES PATENT OFFICE.

ADOLPH W. MACHLET, OF ELIZABETH, NEW JERSEY.

FURNACE FOR MELTING METALS.

Application filed April 15, 1926. Serial No. 102,097.

This invention relates to melting brass, copper, iron and other metals and alloys, in small or large quantities.

In the usual open hearth or other reverberatory furnace, the top layer or portion of metal is directly exposed to flames, for the purpose of melting not only the top portion but the underlying portions as well. The top portion becomes greatly overheated. There is great over-consumption of fuel, in comparison with the actual change that should take place in the heat of metal in passing from a cold state to a melted state. Moreover there is enormous waste of metal from oxidation which occurs quickly at and above the melting point, as for example in the case of iron, or brass. The zinc component of brass and other alloys evaporates quickly when heated to or above the melting point of the alloy.

One of the usual difficulties in melting brass scrap is that the zinc is all burned out from the brass scrap by contact with the flames. In a reverberatory furnace the whole top surface of the metal is subjected to the process of combustion, and the loss from both oxidation and evaporation is very great, and continues from start to finish of the melting operation.

In a cupola furnace the lumps of fuel and the lumps of metal are mixed, the fuel keeping the metal pieces separated, preventing the metal lumps from fusing together and choking the cupola. The loss from oxidation and evaporation is very high, and in this and other furnaces it is necessary to add flux at short intervals, which is an objection, particularly when only a small output of melted metal is required.

The use of the ordinary crucible for melting is also open to the objection that there must be a great over-consumption of fuel in proportion to the small amount of metal which is melted in the crucible.

The principal object of the invention is to melt brass, iron, copper and other metals and alloys with great economy of heat and great reduction in the waste of metal from oxidation and evaporation, and also to make it practicable to melt the metal in small quantities where desired.

According to the present invention, the scraps or lumps of metal are heated nearly to the melting point by exposing them to heat which is below melting heat. Up to this stage, neither oxidation nor evaporation occurs. In other words, the metal is caused to absorb nearly sufficient heat to effect its melting, without exposing the metal to loss from oxidation or evaporation. While the metal is in this hot condition, it is exposed for a very short time to melting heat, thus minimizing the opportunity for oxidation and evaporation, so that loss of metal is greatly reduced. Moreover, the metal is exposed to melting heat over only a comparatively small area thereof, thus still further reducing the loss.

A magazine having a shaft or barrel is filled with the scrap or other metal, the bottom of the shaft discharging into a crucible which is set within a gas or oil or electrically-heated furnace, and the flames from the burners furnish enough heat to melt the lowest stratum of metal. The hot gases or products of combustion circulate up around the magazine, and their heat is partly absorbed by the metal, and so at the top of the shaft the heat of the metal is least, while at the bottom it is greatest. The vertical column of metal sinks in the magazine or shaft (which is fed from the top) and as each portion of metal descends its heat is increased, although still remaining below the oxidizing or evaporating point, until it reaches a crucible at the bottom of the magazine. The crucible sets in the flame-chamber of a furnace. At this point the flames supply sufficiently high heat to convert the already softened metal into fluid, which is collected in a pot, the melted metal being then drawn off at short intervals.

In this melter the heat is not applied at the top, and the heat is not at first received from the fuel direct, and therefore the metal comes to a high heat without coming into contact with the fuel. At the point of melting, it is only the top surface of the melted contents of the crucible that is exposed to the direct action of the fuel, and this exposure is of very short duration.

The metal is not subjected to the final melting heat any longer than is necessary, which is of great advantage in the case of brass, etc. The metal is not subjected to any evaporating or oxidizing effect during the first heating stages, nor, in fact, until it is actually brought to the melting point. Owing to the fact that brass and other scraps have large surfaces in proportion to their bulk, heat is rapidly absorbed, and only a short exposure to melting heat is required, thus making the invention especially valuable for this class of work. A moderate amount of flux may be used.

Only the surface of the liquid in the pot is exposed directly to the flames, so that loss of metal is slight, and the remaining metal is melted without coming into contact with the flames. The time during which metal is exposed to the flames is much less than by former methods.

It will also be perceived that there is a decided reduction in the waste of heat. Nearly all of the heat of the fuel is absorbed by the metal, thus effecting great economy. A large part of this heat is absorbed before the metal finally becomes melted, which is a novel feature in this art. All of the heat units are utilized that it is practicable to utilize.

One of the objects of the invention is to facilitate the use of industrial gas for the purpose of melting metal. There may be melted iron suitable for malleable iron castings, where small, fine castings are required. It is not usual to prepare malleable iron in a furnace which uses gas. It is not required to melt iron for large malleable castings, but it is used mainly for small castings, and this invention has particular value in this field.

In the preferred form of the invention, no atmospheric air enters the furnace except through the burners. By means of regulators the most economical and best results are obtained by thinning the gas mixture with air until a mixture is secured which gives a maximum of heat. But when such mixture is employed, it results that the oxygen in the mixture is not entirely used up. There enters the furnace in the combustible mixture a surplus of oxygen, that is, more oxygen than is used up in consuming the fuel gas which forms part of the mixture, and it is this surplus oxygen which oxidizes some of the melted metal. This surplus oxygen cannot be entirely avoided, inasmuch as unless the air and gas are admitted to the furnace in the usual proportions, the required degree of heat cannot be attained. The overplus oxygen attacks the melted metals and oxidizes the same to a certain extent, which is a detriment. One of the further objects of the invention therefore is to minimize or prevent the oxidation which occurs when the most economical mixture of fuel gas and air is employed.

To overcome this loss of melted metal through oxidation, means is provided for avoiding the attack upon the melted metal by the surplus oxygen. This is done by the separate introduction into the furnace of combustible means which will unite with said surplus oxygen more readily than will the metal. This means consists preferably of a fuel gas which is separately admitted to the furnace in raw condition, that is, unmixed with air. A proportion of five per cent or more of fuel gas, admitted through a separate orifice into the furnace (which is filled with flames from combustion of the mixture supplied by the regular burners), will suffice to take up the surplus oxygen from the regular burners and combine therewith, thereby neutralizing or preventing said surplus oxygen from uniting with the metal. This neutralizing gas for the surplus oxygen, although it constitutes an over-supply of fuel, does not diminish the heat of the melting furnace, because it may be admitted through a separate orifice or burner, and preferably under lower pressure than the mixture of fuel gas and air. When the furnace is in operation, there is a slight pressure therein and atmospheric air cannot enter the furnace and combine with said neutralizing gas, and the latter can only burn by combining with the surplus of oxygen that has already been introduced into the furnace, whereby said surplus of oxygen is precluded from attacking the melted metal.

The fuel gas and air may be mixed and compressed at a point outside of the furnace, and the mixture supplied directly to the burners. The supply of auxiliary or neutralizing fuel gas may be taken directly from the gas-supply main, through a regulating valve; or oil may be used.

The proportion of about five per cent of raw fuel gas to ninety-five per cent of the usual gas and air fuel mixture suffices for combination with all of the surplus oxygen, so that the metal is melted by flames from which substantially all of the oxygen has been extracted in this manner.

Another advantage is that metal having a carbon content may be melted with but little if any loss of the carbon, which is an advantage, especially if such carbon content is low; the raw gas or oil or other raw fuel taking up the surplus of oxygen that is in the compressed fuel mixture, and preventing said surplus from robbing the melted metal of its carbon.

Other features and advantages will hereinafter appear.

In the accompanying drawings,

Figure 1 is a central sectional elevation of one form of melter showing the present invention.

Figure 2 is a plan of the same, partly in section, on the line 2—2 of Figure 1.

Figure 3 is an elevation with parts broken away, showing the flame-chamber of the melter detached from the preheating oven, to permit the former to be conveniently rolled away for repairs.

Figure 4 is a sectional plan, showing the flame-chamber and other elements of the bottom of the furnace.

The melter may be a self-feeder, the stock 10 of metal lumps and scraps being deposited in a pre-heating magazine, the upper part of which is in the form of a funnel 11, which may be kept filled, so as to maintain the weight of the descending stock at a maximum, and also so as to prolong the time during which the stock may absorb heat below the vaporizing or oxidizing point. From this funnel the banked stock sinks into a vertical barrel in the form of an upstanding tube or pipe 12, which forms part of the pre-heating magazine and extends down through the center of a preliminary heating oven in the form of a stack 13, this arrangement forming an annular flue or oven of great height in proportion to its diameter, permitting extensive circulation of hot gases, and conducing to the absorption of heat from the gas, and also prolonging the time used by the stock for its descent or progress, thereby extending the period during which the descending scraps are exposed in the magazine to the heat of the oven. Said barrel may be formed of heat-resisting metal, such for example as nichrome, or a special steel casting.

From the magazine the highly heated metal stock sinks into a second barrel forming a retort 14 of refractory material opening at the top into the magazine-barrel 12, and erected on end within the flame-chamber 15 of a furnace 15ᵃ. The flame-chamber has at its lower portion a series of burners 16 spaced evenly around the furnace and all connected by pipes 17 to a main 18 for supplying a fuel mixture, which is usually compressed air and gas; the supply being controlled in any suitable way, as by a valve 19.

While the stock, owing to the great absorbing surfaces of the lumps and scraps, absorbs much heat in descending through the magazine, still it is not yet brought to melting heat, where evaporation or oxidation would take place, because nothing but the products of combustion enter the flue or oven 13. The heat in the flame-chamber 15 is necessarily high, and has a corresponding effect upon the descending stock that reaches the retort, so that said stock is softened by the heat and rendered plastic, and the pieces of metal tend to amalgamate, as indicated at 32, and to consolidate into a softened but still solid and dense mass in the lower part of the crucible, the density preventing oxidation. At this time the descending mass becomes liquescent from the great heat to which it is exposed at this stage, and it is only necessary for this liquescent mass to absorb a few more degrees of heat in order to melt, the melting taking place at the bottom of the retort, and the melted portion escaping from the retort, after the manner of liquation, there being a melting of only the liquescent portion of the retort's contents. Said softened, plastic and liquescent portions from in the lower part of the crucible a solid mass tending to prevent the molten liquid from rising within the crucible or from overheating the overlying stock.

At no point is the unmelted stock exposed to direct attack of the flames. The stock, while still unmelted, absorbs almost enough heat to effect its melting, so that the work of the apparatus is almost fully accomplished before the metal reaches the evaporating or oxidizing point, while the entire cost is reduced to a very low point. The only contact of flame with metal is at the surface of the melted metal in the pot, but the duration of the contact is short, and loss from oxidation or evaporation is minimized.

The melted metal flows from the bottom of the retort 14 through outlets 20, of which any required number may be formed by scalloping the bottom edge of the crucible barrel 14, and is collected by a pot 22, upon the floor 21 of which the bottomless crucible stands, said floor forming a hearth. The pot or collecting basin is formed of refractory material and fits within the furnace below the burners, and forms the lower portion of the flame-chamber. The basin-floor slopes towards the left, where it is formed with a tap-hole 23 leading to a discharge-spout 24, the tap-hole being closed by a removable plug 25. At fifteen or twenty minute intervals, or as often as the molten fluid rises nearly to the top of the pot 22, the plug 25 may be removed and the fluid withdrawn from the pot and the plug replaced.

The flames from the burners raise the metal at the lower part of the retort to the melting point, and maintain at that point the metal which flows into the pot 22. At the same time a great part of the heat from the flames is conserved by permitting the partly cooled products of combustion to escape upwardly through an annular or restricted passage or vent 26, formed in the top of the flame-chamber, into the oven 13, and much of the heat is thus utilized that is generated at the burners, the heat in the oven, however, ruling substantially lower than the metal-melting heat in the flame-chamber. The oven is of great diameter and capacity in proportion to the diameter of the pre-heating barrel 12 therein, so that much heat is absorbed by the metal stock as it sinks through said barrel.

In the top of the oven may be formed an uptake or passage 27 around the neck of the barrel 12, this passage being constricted so as to render it practicable to confine the highly heated gas within the flame-chamber for melting purposes. The barrel may be provided with a cap or flange 28 having outlets 29 through which the hot gases may continue up into an annular conical chamber 30 surrounding the funnel 11, thereby initially heating the pieces of metal in said funnel; the relatively cooled products of combustion wasting through vents 31 in the top of said annular conical chamber. Waste of heat is very small, since nearly all of the heat of the fuel is taken up before the gas escapes.

The furnace may have a heavy lining of refractory material, including a base-piece provided with a rim 33, in which fits the pot 22, and also including a cylindrical body-portion 34 resting on said rim 33, and further including a cap 35, which may be of the same diameter as the body 34 and the bottom 33, and having the aforesaid small central passage or opening 26 around the retort. This refractory material may be jacketed with non-conducting material 36, which may be enclosed in a metal case 37 having a sheet-metal bottom 38. The flue or oven 13 may have a tubular refractory lining 39 resting upon the cap 35, whereby escape of gases is prevented; and at its top the oven may have a cap 40 resting upon the lining 39, said cap having the constricted central opening 27 around the neck of the barrel 12. This refractory cylinder 39 may have a jacket 41 of non-conducting material, which may be enclosed in a tubular sheet-metal sheath 42. The flange 28 may rest upon the cap 40. A non-conducting conical lining 43 may surround the chamber or passage 30, and may be supported by a sheet-metal cone 44 secured upon the top of the cap 40. At its top the funnel 11 may be provided with a broad brim 45 having at its outer edge a flange 46 setting down over the brim of the cone 44 to prevent scraps of metal from finding their way into the flues, but permitting the removal of the funnel, whose lower end fits down into the top of the barrel 12. It will be noticed that the escape of the products of combustion is prevented at all points except through the vents 31, through which the gas escapes after a substantial portion of its heat has been absorbed by the metal bodies. The lower part of the upper barrel 12 sets down into the retort 14 sufficiently to prevent gas from escaping from the flue 13 into the barrel.

At its lower part the retort 14 may have convergent or conical sides, as at 47, so that as the loose scraps become softened and compacted, they may amalgamate and choke the narrowed foot of the crucible, and prevent the molten metal from flowing up within the crucible, and also prevent undue heating, evaporation or oxidation of the contents of the crucible and the pre-heating devices.

The furnace is supported by hanging, so that when it is desired to repair the furnace, bolts 48, which are used to support the furnace from a stand 49, are loosened, thereby permitting the furnace to drop upon the floor of the furnace-room. These bolts are threaded through ears 50, projecting from the sides of the furnace at its top. The stand rests upon legs 51. There may be provided, under the bottom 38 of the furnace, rolls 52, which rest upon the floor and permit the furnace to be trundled away, thereby giving access to the retort 14 and other portions. After repairs are made, the furnace-body may be rolled back under the stand, and by means of the bolts 48 may be raised sufficiently to close the top slab 35 against the bottom of the upper lining 39, and bring the upper end of the crucible 14 around the lower end of the barrel 12. An observation opening 53 may be provided at the bottom of the flame-chamber above the edge of the pot 22.

The separate burner for the small supply of raw gas is indicated at 54, being connected by a valve 55 to a main 56; the economy of this feature having been already set forth.

Variations may be resorted to within the scope of the invention, and portions of the improvements may be used without others.

Having thus described my invention, I claim:

1. A melter including a magazine for loose stock, said magazine including a barrel and a crucible into which the barrel discharges, and a furnace within which the crucible is supported, said furnace provided with a constricted vent, whereby the heat is confined in the furnace at a metal-melting temperature, and an oven into which said vent discharges, said barrel confined within said oven.

2. A melter including a magazine for loose stock, said magazine including a barrel and a crucible into which the barrel discharges, and a furnace within which the crucible is supported, said furnace having burners for compressed air and fluid fuel opening into the lower part of the furnace, said furnace provided with a constricted vent, whereby the heat is confined in the furnace at a metal-melting temperature, and an oven into which said vent discharges, said barrel confined within said oven.

3. A melter including a magazine for loose stock, said magazine including a barrel and a crucible into which the barrel discharges, a furnace within which the crucible is supported, said furnace having burners for compressed air and fluid fuel opening into the lower part of the furnace, said furnace provided with a constricted vent, and a flue within which said barrel is arranged, said vent opening in said flue, whereby the partly cooled products of combustion from the furnace are caused to circulate around the upper part of the column of stock and pre-heat the same to a point substantially below the heat of the furnace, said flue having a vent.

4. A melter including a furnace having a flame chamber, a pot in the furnace, a retort in the flame chamber and discharging into the pot, a barrel surmounting the retort and discharging thereinto and forming with the retort a magazine for a column of metal stock, and a flue carrying off the products of combustion from said flame chamber and surrounding said barrel to pre-heat the stock therein.

5. A melter including a furnace having a flame chamber, a pot in the furnace, a retort in the flame chamber and discharging into the pot, a barrel surmounting the retort and discharging thereinto and forming with the retort a magazine for a column of metal stock, and a flue carrying off the products of combustion from said flame chamber and surrounding said barrel to pre-heat the stock therein, said retort having an opening at the bottom and seated in the pot, and said opening permitting the melted metal from the retort to collect in the pot.

6. A melter including a furnace having a flame chamber, a pot in the furnace, a retort in the flame chamber and discharging into the pot, a barrel surmounting the retort and discharging thereinto and forming with the retort a magazine for a column of metal stock, and a flue carrying off the products of combustion from said flame chamber and surrounding said barrel to pre-heat the stock therein, said retort having an opening at the bottom and seated in the pot, and said opening permitting the melted metal from the retort to collect in the pot, said furnace having burners for a mixture of compressed air and fuel and also having a burner for burning a supply of raw gas in proportion of about 5 per cent of the volume of mixed air and fuel.

7. A melter including a furnace having a flame chamber, a pot in the furnace, a retort in the flame chamber and discharging into the pot, a barrel surmounting the retort and discharging thereinto and forming with the retort a magazine for a column of metal stock, and a flue carrying off the products of combustion from said flame chamber and surrounding said barrel to pre-heat the stock therein, said magazine having at its upper end a funnel in which the stock is deposited.

8. A melter including a furnace having a flame chamber, a pot in the furnace, a retort in the flame chamber and discharging into the pot, a barrel surmounting the retort and discharging thereinto and forming with the retort a magazine for a column of metal stock, a flue carrying off the products of combustion from said flame chamber and surrounding said barrel to pre-heat the stock therein, said magazine having at its upper end a funnel in which the stock is deposited, and means for pre-heating the stock while it is in said funnel and bringing it to a higher heat while it is in said barrel.

9. In combination, a funnel, a barrel into which the funnel discharges, a retort into which the barrel discharges, a furnace having a flame chamber, said retort within said flame chamber and discharging melted metal at its lower end, means for collecting the melted metal, and a flue surrounding said barrel for causing the partly cooled products of combustion to circulate around the barrel, said flame chamber having a constricted vent which opens into said flue, said vent of a proportion to maintain the flame chamber at metal-melting heat and the work in said barrel at substantially lower heat.

10. A melter including a furnace having a flame chamber, a pot in the furnace, a retort in the flame chamber and discharging into the pot, a barrel surmounting the retort and discharging thereinto and forming with the retort a magazine for a column of metal stock, and a flue carrying off the products of combustion from said flame chamber and surrounding said barrel to pre-heat the stock therein, said retort having an opening at the bottom and seated in the pot, and said opening permitting the melted metal from the retort to collect in the pot, said flame chamber having at its lower portion a series of burners for a fuel mixture.

11. In combination, a funnel, a barrel into which the funnel discharges, a retort into which the barrel discharges, a furnace having a flame chamber, said retort within said flame chamber and discharging melted metal at its lower end, and a flue surrounding said barrel for causing the products of combustion to circulate around the barrel, said flame chamber having at its lower portion a series of burners for a fuel mixture, said retort setting within a pot which collects the melted liquid, the top of said pot being below the burners in the furnace and being provided with a tap hole.

12. In combination, a funnel, a barrel into which the funnel discharges, a retort into which the barrel discharges, a furnace having a flame chamber, said retort within said flame chamber and discharging melted metal at its lower end, a flue surrounding said barrel for causing the products of combustion to circulate around the barrel, said flame chamber having at its lower portion a series of burners for a fuel mixture, and a collecting pot for the melted metal, said retort being entirely open at its lower end and resting upon the floor of the pot, and having scallops in its bottom edge for escape of melted liquid into the pot.

13. A melter including a magazine for loose stock, said magazine including a barrel and a crucible into which the barrel discharges, a furnace within which the crucible is supported, said furnace having burners for compressed air and fluid fuel opening into the lower part of the crucible, and a flue within which said barrel is arranged, whereby the products of combustion from the furnace are caused to circulate around the upper part of the column of stock and pre-heat the same, a constricted vent being provided at the top of the furnace leading to said flue, said vent sufficiently constricted to preserve the heat of the furnace at a far higher point than the heat of the flue.

14. In combination, a funnel, a barrel into which the funnel discharges, a retort into which the barrel discharges, a furnace having a flame chamber, said retort within said flame chamber and discharging melted metal at its lower end, means for collecting the melted metal, a flue surrounding said barrel for causing the products of combustion to circulate around the barrel, an up-take leading from the top of the flue and up around said funnel, and thereby exposing the stock to heat while it is in the funnel, and a vent at the top of the up-take for the partly cooled gas.

15. A melter including a furnace having a flame chamber, a pot in the furnace, a retort in the flame chamber and discharging into the pot, a barrel surmounting the retort and discharging thereinto and forming with the retort a magazine for a column of metal stock, a flue carrying off the products of combustion from said flame chamber and surrounding said barrel to pre-heat the stock therein, said furnace having a refractory base or bed provided with a rim within which said pot is confined, a cylindrical body resting on said rim, and a cap surrounding the upper part of said retort and leaving a constricted passage to the flue in which said barrel is arranged.

16. A melter including a furnace having a flame chamber, a pot in the furnace, a retort in the flame chamber and discharging into the pot, a barrel surmounting the retort and discharging thereinto and forming with the retort a magazine for a column of metal stock, a flue carrying off the products of combustion from said flame chamber and surrounding said barrel to pre-heat the stock therein, said furnace having a refractory base or bed provided with a rim within which said pot is confined, a cylindrical body resting on said rim, a cap surrounding the upper part of said retort and leaving a constricted passage to the flue in which said barrel is arranged, and a cap for the top of said flue, said cap having a constricted opening to said flue surrounding the neck of the barrel.

17. A melter including a furnace having a flame chamber, a pot in the furnace, a retort in the flame chamber and discharging into the pot, a barrel surmounting the retort and discharging thereinto and forming with the retort a magazine for a column of metal stock, a flue carrying off the products of combustion from said flame chamber and surrounding said barrel to pre-heat the stock therein, said furnace having a refractory base or bed provided with a rim within which said pot is confined, a cylindrical body resting on said rim, a cap surrounding the upper part of said retort and leaving a constricted passage to the flue in which said barrel is arranged, a cap for the top of said flue, said cap having a constricted opening to said flue surrounding the neck of the barrel, a chamber to which said constricted opening leads, and a funnel within said chamber, the latter having at its top a vent for the partly cooled products of combustion.

18. A melter including a furnace having a flame chamber, a pot in the furnace, a retort in the flame chamber and discharging into the pot, a barrel surmounting the retort and discharging thereinto and forming with the retort a magazine for a column of metal stock, a flue carrying off the products of combustion from said flame chamber and surrounding said barrel to pre-heat the stock therein, said furnace having a refractory base or bed provided with a rim within which said pot is confined, a cylindrical body resting on said rim, a cap surrounding the upper part of said retort and leaving a constricted passage to the flue in which said barrel is arranged, a cap for the top of said flue, said cap having a constricted opening to said flue surrounding the neck of the barrel, a chamber to which said constricted opening leads, and a funnel within said chamber, the latter having at its top a vent for the partly cooled products of combustion, said funnel having at its top a broad brim which fits down over the edge of said chamber; the lower end of the funnel fitting down within the top of the barrel.

19. A melter including a magazine for loose stock, said magazine including a barrel and a retort into which the barrel discharges, a furnace within which the retort is supported, said furnace having burners for compressed air and fluid fuel opening into the lower part of the furnace, and a flue within which said barrel is arranged, said furnace having a constricted vent opening into said flue, whereby the partly cooled products of combustion from the furnace are caused to circulate around the upper part of the column of stock and pre-heat the same, the lower part of the barrel setting down into the retort to prevent gas from escaping from the flue into the barrel, said vent of proportions to preserve the furnace at metal-melting heat and the work in said barrel at a substantially lower heat.

20. A melter including a furnace having a flame chamber, a pot in the furnace, a retort in the flame chamber and discharging into the pot, a barrel surmounting the retort and discharging thereinto and forming with the retort a magazine for a column of metal stock, and a flue carrying off the products of combustion from said flame chamber and surrounding said barrel to pre-heat the stock therein, said retort having an opening at the bottom and seated in the pot, and said opening permitting the melted metal from the retort to collect in the pot, said retort tapering at its lower end to conduce to formation of the softened stock into a compact mass.

21. A melter including a magazine for loose stock, said magazine including a barrel and a retort into which the barrel discharges, a furnace within which the retort is supported, said furnace having burners for compressed air and fluid fuel opening into the lower part of the retort, a flue within which said barrel is arranged, said flue in communication with the furnace, whereby the products of combustion from the furnace are caused to circulate around the upper part of the column of stock and pre-heat the same, the lower part of the barrel setting down into the retort to prevent gas from escaping from the flue into the barrel, and means suspending said furnace above the floor and permitting it to be dropped sufficiently to enable the retort to clear the lower end of the barrel.

22. A melter including a magazine for loose stock, said magazine including a barrel and a retort into which the barrel discharges, a furnace within which the retort is supported, said furnace having burners for compressed air and fluid fuel opening into the lower part of the retort, a flue within which said barrel is arranged, said flue in communication with the furnace, whereby the products of combustion from the furnace are caused to circulate around the upper part of the column of stock and pre-heat the same, the lower part of the barrel setting down into the retort to prevent gas from escaping from the flue into the barrel, means suspending said furnace above the floor and permitting it to be dropped sufficiently to enable the retort to clear the lower end of the barrel, and rolls upon said furnace for transportation.

ADOLPH W. MACHLET.